(12) United States Patent
Fesmire et al.

(10) Patent No.: US 10,431,355 B1
(45) Date of Patent: Oct. 1, 2019

(54) FEED-THROUGH ASSEMBLY FOR CONVEYANCE OF A FEED ELEMENT

(71) Applicant: United States of America as Represented by the Administrator of NASA, Washington, DC (US)

(72) Inventors: James E. Fesmire, Titusville, FL (US); Adam M. Swanger, Orlando, FL (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 171 days.

(21) Appl. No.: 15/717,021

(22) Filed: Sep. 27, 2017

Related U.S. Application Data

(60) Provisional application No. 62/400,945, filed on Sep. 28, 2016.

(51) Int. Cl.
*H01B 17/30* (2006.01)
*H01B 3/42* (2006.01)

(52) U.S. Cl.
CPC .......... *H01B 17/308* (2013.01); *H01B 3/427* (2013.01)

(58) Field of Classification Search
CPC ......... H01B 17/308; H01B 3/427; G02B 6/00
See application file for complete search history.

(56) References Cited

U.S. PATENT DOCUMENTS

| | | | |
|---|---|---|---|
| 3,780,585 A | 12/1973 | Milo | |
| 4,508,797 A * | 4/1985 | Knoedler | H01M 2/08 429/181 |
| 4,565,093 A * | 1/1986 | Jurva | H01M 2/065 429/90 |
| 4,593,970 A * | 6/1986 | Rhodes | G02B 6/4428 174/70 S |
| 4,891,640 A | 1/1990 | Ip | |
| 5,441,107 A | 8/1995 | Esser et al. | |
| 5,494,101 A | 2/1996 | Esser et al. | |
| 5,497,828 A | 3/1996 | Esser et al. | |
| 6,445,868 B1 | 9/2002 | Grunbeck et al. | |
| 6,526,212 B1 | 2/2003 | Mishriky et al. | |
| 7,726,876 B2 | 6/2010 | Laverdiere et al. | |

OTHER PUBLICATIONS

"Novel Feedthrough for Instrumentation Lead Wires," NASA Tech Briefs, Oct. 2015, p. 48-49, vol. 39 No. 10.

* cited by examiner

*Primary Examiner* — Timothy J Thompson
*Assistant Examiner* — Rhadames Alonzo Miller
(74) *Attorney, Agent, or Firm* — Jonathan J. Leahy; Mark W. Homer (57) ABSTRACT

The feed-through assembly provides for the conveyance of a feed element from one boundary environment to another. The feed-through assembly includes the following components (from bottom to top) each with an axially extending aperture through which at least one feed element passes: lower compression member; packing stack including a plurality of packing buttons; and upper compression member. The plurality of packing buttons are made from expanded polytetrafluoroethylene (ePTFE) foam material (e.g., GORE-TEX®). A portion of the feed element is sealed within the packing stack including the plurality of packing buttons after it is compressed between the two compression members. The feed-through assembly is very cost effective and easy to make, but provides solutions to sealing problems under severe conditions or for extremely demanding requirements.

21 Claims, 5 Drawing Sheets

FEED-THROUGH ASSEMBLY FOR CONVEYANCE OF A FEED ELEMENT

CROSS-REFERENCE TO RELATED PATENT APPLICATIONS

This patent application claims the benefit of and priority to U.S. Provisional Patent Application Ser. No. 62/400,945, filed Sep. 28, 2016, the contents of which are hereby incorporated by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND OF THE INVENTION

Field of the Invention

The present invention relates generally to a feed-through assembly for the conveyance of a feed element from a first boundary environment to a second boundary environment.

Description of Related Art

Numerous feedthrough products are on the market for environments with a vacuum on one side and ambient air on the other side. These include, for example, Insulator Seal—Division of MDC Vacuum Products, Kurt J. Lesker, and others. Other feedthrough products exist for environments with high pressure on one side and ambient air on the other side (e.g., Conax). All of these feedthrough products are specialized and expensive and generally not reconfigurable. Additionally, none of these products are suitable for use in a complete cryogenic environment, such as full immersion in liquid hydrogen at 20K, where the temperature and quality of liquid gases such as helium and hydrogen must be contained with essentially zero leakage, e.g., less than $1\times10^{-9}$ standard cubic centimeters per second (scc/sec) of helium gas.

Cryogenic valves exist that include stacked seal rings. Cryogenic valves often have extended stems with a stack of seals made from polytetrafluoroethylene (PTFE (e.g., Teflon®)) or a similar fluoropolymeric material. These seal stacks are called stem packing and are composed of a stack of typically 4 to 12 or more seal rings with a chevron geometry. The edge of each seal, as it is compressed and deflected outward makes a pinch point (sealing contact) at that edge. Each sealing edge backs up the previous one and so on creating a very difficult path for any gas molecules to escape to the outside environment. Each seal ring is precision manufactured and the stack is precision assembled onto a precision stainless steel shaft. However, none of these products are available for full-immersion in a cryogenic environment and not for sealing around instrumentation lead wires.

Joint sealant material made from expanded polytetrafluoroethylene (ePTFE) foam material (e.g., GORE-TEX®) is also known and available from a number of different manufacturers. Materials of ePFTE come in both rope form and sheet form in a range of sizes. Once compressed, the material will fully occupy the closed volume and take a semi-permanent set for sealing against the housing tube. The set is semi-permanent because it still offers the necessary compliance for changes due to pressurization/depressurization and thermal contraction/expansion. The non-linear mechanical stress-strain and creep relaxation phenomena are a central part of the working of ePTFE in high performance sealing systems. However, Applicant is not aware of the use of this material in a stack assembly or for the sealing of lead wires routed through the thickness of the sheet material.

BRIEF SUMMARY OF THE INVENTION

The present invention relates generally to a feed-through assembly for the conveyance of one or more feed elements from a first boundary environment to second boundary environment. The feed-through assembly finds particular application in cryogenic process systems with extreme leak tightness requirements that are capable of being managed by a relatively simple and economical approach as described herein. The feed-through assembly is directly applicable, without reservation, to any process, system, or instrumentation device. The feed-through assembly provides solutions to sealing problems under severe conditions or for extremely demanding requirements.

The feed-through assembly includes the following components each with an axially extending aperture through which at least one feed element 18 extends: a lower compression member 5; an upper compression member 6; and a packing stack including a plurality of packing buttons 17 located between said upper and lower compression members 5, 6. The packing stack has a lower packing button directly in contact with a surface of the lower compression member 5 and an upper packing button directly in contact with a surface of the upper compression member 6. The packing buttons 17 in the packing stack are made from expanded polytetrafluoroethylene (ePTFE) foam material (e.g., GORE-TEX®). A portion of at least one feed element 18 is sealed within the packing stack by compressing the plurality of packing buttons 17 between the upper compression member 6 and lower compression member 5. A distal end of at least one feed element 18 is exposed to a first boundary environment and a proximal end is exposed to a second boundary environment.

The materials of construction, sealing effectiveness, and mechanical commonality allows the present invention to be directly employed in different industries including, but not limited to, food processing, semi-conductor manufacturing, automotive, medical equipment, etc. Also, because of the simplicity of the approach, the feed-through assembly can be directly applied to lower end sealing performance applications such as irrigation, fire suppression, and a wide variety of industrial and commercial uses.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE INVENTION

The feed-through assembly according to the present invention comprises:

a) a lower compression member 5 including an axially extending aperture extending between an inner, lower compression member surface and an outer, lower compression member surface;

b) an upper compression member 6 including an axially extending aperture extending between an inner, upper compression member surface and an outer, upper compression member surface;

c) a packing stack including a plurality of packing buttons 17 each including axially extending apertures, said packing stack has a lower packing button adjacent to the inner, lower compression member surface and an upper packing button adjacent to the inner, upper compression member surface, and wherein each of the packing buttons is made from expanded polytetrafluoroethylene (ePTFE) foam material; and d) at least one feed element 18 including a distal end and a proximal end, the at least one feed element 18 extends through the apertures of each of the lower compression member 5, the packing stack including a plurality of packing buttons 17, and the upper compression member surface 6, said distal end of the at least one feed element 18 is exposed to a first boundary environment and said proximal end of the at least one feed element 18 is exposed to a second boundary environment.

In one embodiment of the present invention, the distal end of the at least one feed element 18 is connected to a sensor 20 and the proximal end of the at least one feed element 18 is connected to a monitoring device. The sensor 20 may be retained beyond the outer surface of the lower compression member 5 or retained within a portion of the axially extending aperture of the lower compression member 5.

Figure 1:
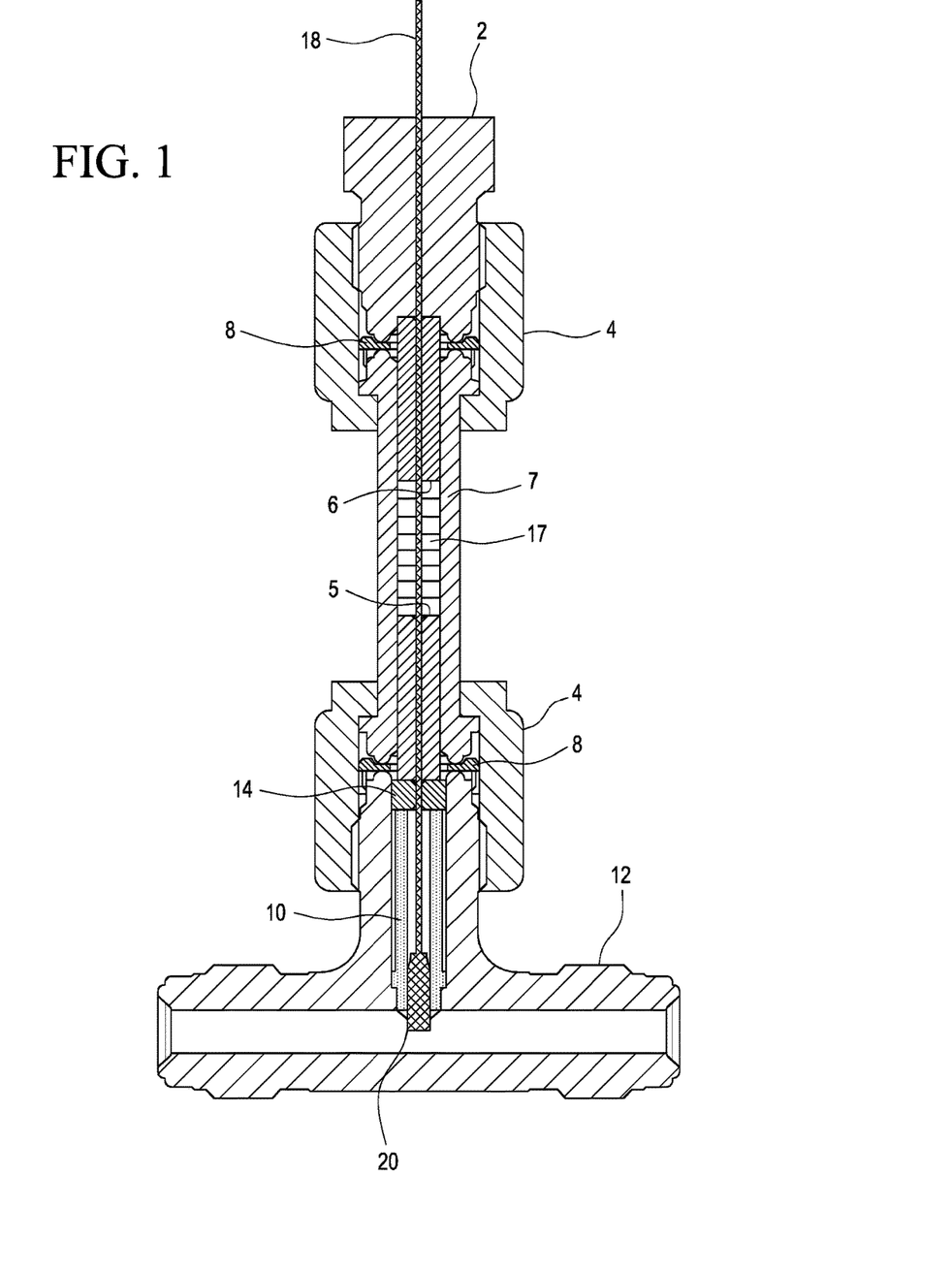
FIG. 1 is a cross-section view of the feed-through assembly in accordance with one embodiment of the present invention.

FIG. 1 shows one embodiment of a feed-through assembly in accordance with the present invention, wherein the feed-through assembly includes:

i) an optional reaction pin 10 having an axially extending aperture between a first reaction pin end and a second reaction pin end;

ii) an optional reaction bearing 14 having an axially extending aperture between a first reaction bearing end and a second reaction bearing end, wherein that said first reaction bearing end is adjacent to said second reaction pin end;

iii) a lower compression member 5 including an axially extending aperture extending between an inner, lower compression member surface and an outer, lower compression member surface, wherein said outer, lower compression member surface is adjacent to said second reaction bearing end;

iv) a packing stack including a plurality of packing buttons 17 each including axially extending apertures, said packing stack has a lower packing button and upper packing button, said packing buttons are made from expanded polytetrafluoroethylene (ePTFE) foam material, wherein said lower packing button is adjacent to the inner, lower compression member surface;

v) an upper compression member 6 including an axially extending aperture extending between an inner, upper compression member surface and an outer, upper compression member surface, wherein said inner, upper compression member surface is adjacent to said upper packing button;

vi) an optional plug 2 having a first plug end and a second plug end, wherein the first plug end is adjacent to said outer, upper compression member surface; and vii) at least one feed element 18 including a distal end and a proximal end, the at least one feed element extends through the apertures of each of the optional reaction pin 10, optional reaction bearing 14, lower compression member 5, the packing stack including a plurality of packing buttons 17, the upper compression member surface 6, and the optional plug 2, said distal end of the at least one feed element 18 is exposed to a first boundary environment and said proximal end is exposed to a second boundary environment. In one embodiment, the distal end of the at least one feed element is connected to a sensor 20 and the proximal end of the at least one feed element 18 is connected to a monitoring device. The sensor 20 may be retained beyond the first end of the reaction pin 10 or retained within a portion of the axially extending aperture of the reaction pin 10.

In one embodiment of the present invention, the packing buttons 17 are individually punched for a desired slight randomness in the alignment of each axially extending aperture. The tolerance of the aperture position within the packing buttons 17 depend on the feed element 18 diameter/shape (primarily) and the packing button 17 diameter (secondarily). In an example using a 0.030-inch needle punching a plurality of 0.188-inch diameter packing buttons 17, a tolerance of ±0.015 inch may be allowed, or greater than 0.006 inch. During testing, this offset configuration has resulted in a very high level of sealing effectiveness, i.e. less than $1 \times 10^{-9}$ scc/s helium leakage rate, on the order of welded stainless steel joints. Typically, the packing buttons 17 are compressed to approximately 20-80%, or 40-80%, or 40-50%, of their original height. This compression is accomplished by the lower compression member 5 and upper compression member 6 compressing the packing stack including the plurality of packing buttons 17 with minimal twisting. This high amount of displacement accomplishes the sealing effect and provides the capability for one or more different feed elements 18 to be carried. These feed elements 18 may be of different shapes and sizes with a suitably sized and located pin hole for each aperture.

In one embodiment, the feed element 18 is a diode temperature sensor used to measure the helium (or other suitable refrigerant) temperature and quantify performance of a liquid hydrogen tank heat exchanger that is part of a cryogenic refrigerator system. The temperature sensor must protrude into the helium (or other refrigerant) flow path to take the temperature reading, but interface at a connector inside the tank where the wire ultimately leads to a data acquisition system. Therefore, a direct leak path between the liquid hydrogen and gaseous helium exists where probes and ribbon slice into the heat exchanger tube. The presently disclosed feed-through assembly is able to accomplish a leak-tight seal that prevents hydrogen from leaking into, or helium (i.e., refrigerant) leaking out of, the heat exchanger. In this embodiment, a unique set of design criteria have been fulfilled: 1) ultra-low temperatures (less than 20K) environment; 2) sealing of the two smallest molecules in the universe (hydrogen and helium) from one another; and 3) tiny wire gauge.

Although, the present invention has found particular success in cryogenic environments wherein hydrogen and helium are monitored, the feed-through assembly of the present invention may be used with any known fluid material, for example, anything from corn syrup to blood plasma to firex water facilities to name a few. Furthermore, the feed-through assembly of the present invention may also be used in high temperature environments, e.g., up to approximately 600° F.

The feed element 18 may be selected from one or more of a wide variety of elements, including, but not limited to ribbon cable, single cable, single filament, multiple filament, coated or sheathed wire, uncoated or unsheathed wire, stranded wire, etc. The feed-through assembly can be readily applied to capillary tubings, fiber options, and many other applications. These applications include medical devices, surgical probes, scientific instruments, process industry, manufacturing, electronics, instrumentation, and so forth.

The feed-through assembly provides a solution for the hermetically sealed feedthrough of wires or tubes or fibers from one process side (i.e., first boundary environment) to another process side (i.e. second boundary environment). Either side can be high pressure or high vacuum (e.g., less than 1×10E-6 ton). Either side can be full cryogenic temperature down to approximately 4K (−452° F. or liquid helium temperature) or elevated temperature up to approximately 590 K (600° F.). Testing has confirmed the application of the present feed-through assembly in the following conditions:

1) 20 K liquid hydrogen on one side and 10 K cold helium on the other side;
2) 10 K cold helium on one side and full vacuum on the other side;
3) ambient conditions on one side and 77 K liquid nitrogen on the other side;
4) 77 K liquid nitrogen on one side and high vacuum on the other;
5) fully immersed in 77 K liquid nitrogen and approximately 500 psi gaseous nitrogen within;
6) steady-state conditions; and
7) highly transient conditions through extreme thermal cycling.

The feed-through assembly of the present invention handles thermal cycling, pressure cycling and severe transient conditions.

In one embodiment of the present invention, the feed-through assembly is incorporated within a central bore of a fluid fitting tee 12 using couplers 4 to monitor the temperature of a gas stream, such as cryogenic hydrogen and/or helium via a diode temperature sensor 20. Gaskets 8 or other standard fluid fitting seals may also be incorporated into the feed-through assembly in order to provide sealing commonality with a wide range of standard industrial products.

In one embodiment of the present invention directed to cryogenic feed-through purposes for sealing against hydrogen or helium, three seals exist in the tee body. The first seal is formed by a suitable cryogenic two-part epoxy, such as STYCAST™ 2850 FT, that both surrounds the small volume between the reaction pin 10 and the tee body 12, and fills the middle axial space where the feed element 18 extends through. A second seal, the primary seal, is formed by the packing stack including a plurality of expanded ePTFE (e.g., TEFLON®) packing buttons 17 that are compressed between the lower and upper compression members 5, 6 within the housing 7 when the plug 2 is tightened. Finally, a third seal is formed by a suitable cryogenic two-part epoxy, such as STYCAST™ 2850 FT, that both surrounds the small volume between the upper compression member 6 and the housing 7, and fills the middle axial space where the feed element 18 extends through. Alternatively, the third seal can be formed by epoxy inside the plug 2 to seal the feed element 18. The first and third seals are optional and independent of each other for providing one or two redundant seals. Rather than forming the third seal, the upper compression member 6 can be interfaced with a leak sensing port for leak containment verification in ultra-sensitive process systems.

In a preferred embodiment, the feed-through assembly may be used in connection with a heat exchanger used to condition and keep liquid hydrogen at optimum conditions and allow it to be effectively managed for future cryofuel applications. The process of controlling and monitoring the heat exchanger system requires temperature sensors at strategic locations along the process flow line mounted within the large fuel tank. The present feed-through assembly allows lead wires from sensors from the cold helium process side to be fed into the liquid hydrogen side so that these wires can successfully be routed through a conventional port on the tank and connected to the computer data system.

In one embodiment of the present invention, the feed-through assembly is reusable as all elements can be easily disassembled and reassembled. In this regard, the ends of the feed-through assembly are preferably not swaged or permanently connected in any manner. Additionally, in this embodiment of the invention none of the elements are destroyed in any manner in order to accomplish the reassembly. In another embodiment, all parts are reused except the packing buttons which are replaced for different feed through elements including instrumentation lead wires, capillary tubes, or other probes.

The following Example is used to illustrate one embodiment of the present feed-through assembly. However, it should be understood by one of ordinary skill in the art that the feed-through assembly may be modified from these preferred embodiments without departing from the scope of the present invention.

EXAMPLE

The following example discloses a feed-through assembly in accordance with one embodiment of the present invention adapted to variable compression ratio (VCR) type fluid fitting connectors by Swagelok to obtain the desired pressure seal in a cryogenic environment containing helium and/or hydrogen, but any commercial connector can be similarly adapted. The VCR tee fitting provides the desired linear compression of the packing stack including the plurality of packing buttons 17 during assembly, but a custom "housing hardware" or other standard fluid fitting (appropriately modified) could work equally well within the scope of the present invention.

Figure 2:
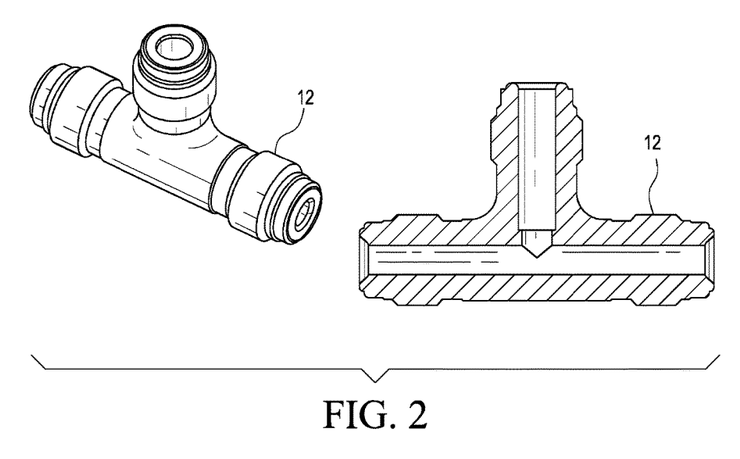
FIG. 2 shows a perspective view and a cross-sectional view of a fluid fitting tee 12 in accordance with one embodiment of the present invention.

FIG. 2 shows a VCR tee body 12 in accordance with this embodiment of the present invention that has been modified as provided herein. The VCR fittings offer a high level of leak sealing integrity that is unmatched for cryogenic and vacuum conditions and other demanding pressure applications. The design can be scaled up to large (e.g., 2" diameter) and even very large sizes (such as 12" or more) without problems. The size described herein (nominal ¼" diameter) is considered a small size and was practical to produce for the field application (four each for the cryogenic refrigeration system heat exchanger within the liquid hydrogen tank).

As seen in FIG. 1 the feed-through assembly is provided within a ¼" Swagelok VCR fitting that includes a tee 12, union, couplers 4, and plug 2. In order to accommodate the reaction pin 10, a 0.180" diameter tee branch hole was bored out to ¹⁵⁄₆₄" (0.234") as seen in FIG. 2. This equates to 0.027" removed from the branch wall thickness.

Figure 3:
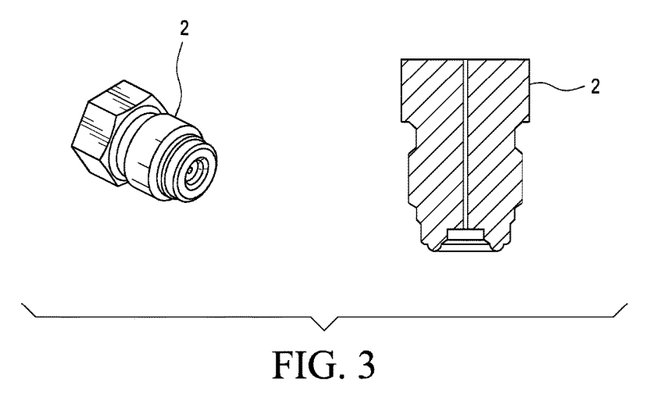
FIG. 3 shows a perspective view and a cross-sectional view of a fluid fitting plug 2 in accordance with one embodiment of the present invention.

As seen in FIG. 3, the VCR plug 2 has also been modified. A ¹⁄₃₂" diameter hole was drilled through the plug 2 to accommodate a wire ribbon. The VCR union remains unmodified. Tables 1-3 show the manufacturer pressure rating and other pertinent information for the fittings.

TABLE 1

Manufacturer Component Information

| Fluid Fitting Component | Size | Material | Pressure Rating |
|---|---|---|---|
| Tee | ¼" | 316 SS | 10,000 psig |
| Female Union | ¼" | 316 SS | 10,000 psig |
| Plug | ¼" | 316 SS | N/A |

TABLE 2

Fluid Fitting Design Information*

| Material | Designator | Specification |
|---|---|---|
| | | Glands, Bodies, and Nuts |
| 316 stainless steel | SS | Bar stock: ASME SA479 ASTM A276 Forged Shapes: ASME SA182 ASTM A314 |

TABLE 2-continued

Fluid Fitting Design Information*

| Material | Designator | Specification |
|---|---|---|
| S17400 | SS | Split-nut assemblies: MPIP Standard 35 |
| 316L stainless steel | 316L | Bar stock: ASME SA479 ASTM A276 Forged Shapes: ASME SA182 |
| 316L VAR Stainless steel | 6LV | SEMI F20-0305 - High Purity (20% minimum elongation allowed) Gaskets |
| Nickel | NI | ASTM F3 |
| 316L stainless steel | SS | ASTM A240 |
| Copper | CU | ASTM B152 |

*Pressure Ratings
All ratings comply with the calculations in accordance with ASME Code of Pressure Piping B31.3, Process Piping and, ASME B31.3, Power Piping
Working pressure ratios determined at room temperature with gasket material shown.

TABLE 3

Fluid Fitting Design Information

| Components | Material | Temperature, ° F., (° C.) |
|---|---|---|
| | 316 stainless steel | |
| | 316L stainless steel | |
| | 316L VAR stainless steel | |
| | 316L stainless steel | 1000 (537) |
| | Nickel | 600 (315) |
| | Copper | 400 (204) |

Figure 4:
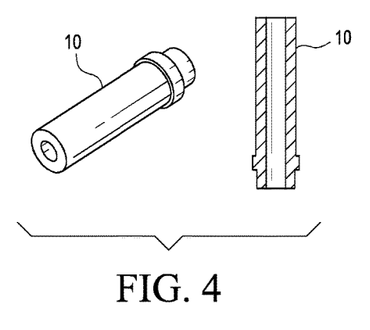
FIG. 4 shows a perspective view and a cross-sectional view of a reaction pin 10 in accordance with one embodiment of the present invention.
Figure 5:
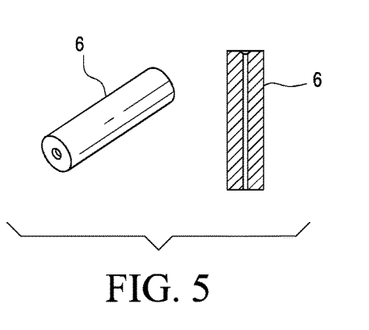
FIG. 5 shows a perspective view and a cross-sectional view of load pins which provide one embodiment of the upper compression member 6 in accordance with one embodiment of the present invention (lower compression member 5 is similar, but not shown)
Figure 6:
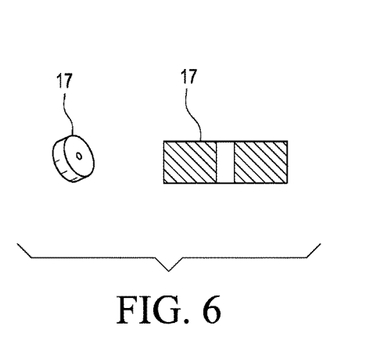
FIG. 6 shows a perspective view and a cross-sectional view of a packing button 17 in accordance with one embodiment of the present invention.
Figure 7:
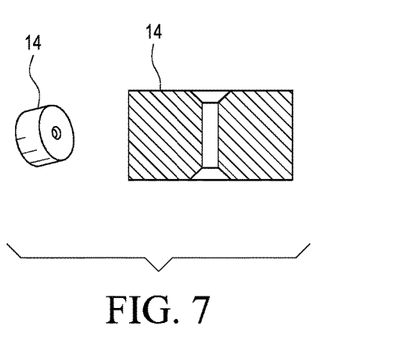
FIG. 7 shows a perspective view and a cross-sectional view of a reaction bearing 14 in accordance with one embodiment of the present invention.

Internal compression elements and expanded ePTFE (e.g., Teflon®) packing provides a leak-tight seal within the fluid fittings. Table 4 provides the specification for the various elements of the feed-through assembly. The load pins forming the lower and upper compression members 5, 6, and reaction bearing 14 have an axially extending aperture near the center of their body that has a diameter of about ¹⁄₃₂ in. As seen in FIG. 4, the reaction pin 10 has a height of about 0.821 in. with an axially extending aperture near the center of its body having a diameter of about 0.090 in. As seen in FIG. 5, the load pins have a height of about 0.670 in and an outside diameter of about 0.180 in. As seen in FIG. 6, the packing buttons 17 have an axially extending aperture near the center of their body that has a diameter of about 0.28 in. The packing buttons 17 have an outside diameter of about 0.188 in. As seen in FIG. 7, the reaction bearing 14 has a height of about 0.125 in. and an outside diameter of about 0.234 in.

TABLE 4

| Element | Part or Stock No. | Description | Stock Size |
|---|---|---|---|
| Plug 2 | SS-4-VCR-P | VCR Plug, 316 Stainless Steel | ¼ in. |
| Coupler 4 | SS-4-WVCR-6DF | Female-to-Female VCR Coupler, 316 Stainless Steel | ¼ in. |
| Load Pin | | Load Pin, G-10 FR4 Glassy Epoxy | ³⁄₁₆ in. |
| Gasket 8 | NI-4-VCR-2-GR | VCR Gasket, Silver plated Nickel | ¼ in. |
| Reaction Pin 10 | | Reaction Pin, Stainless Steel | ³⁄₁₆ in. |
| Tee body 12 | SS-4-VCR-T | VCR Tee, 316 Stainless Steel | ¼ in. |
| Reaction Bearing 14 | | | |
| Packing button 17 | | Packing buttons ePTFE (GORE-TEX GR) | ¹⁄₁₆ in. thick |

Potting, such as Stycast 2850 cryogenic epoxy, may be supplied to the assembly in order to provide double or triple leak sealing protection. In the present example, cryogenic rated Stycast 2850FT with catalyst 23LV by Emerson-Cummings was used as the potting material. The cryogenic rated Stycast epoxy is employed at two locations: 1) inside and around the reaction pin 10 to seal it to the tee body 12 as well as the feed element 18 passing through; and 2) inside and around the upper compression member 6 to seal it to the housing 7 as well as the feed element 18 passing through. Alternatively, the upper seal can be formed by potting inside the plug 2 to seal the feed element 18. However, the present feed-through assembly may be used without any potting. Alternatively, a single potting may be used only around the sensor 20 or double potting may be used. If no potting is used, the feed-through assembly may be easily reconfigurable and reusable. Leak testing in conjunction with pressure and thermal cycling showed that the potting is entirely optional.

Figure 8:
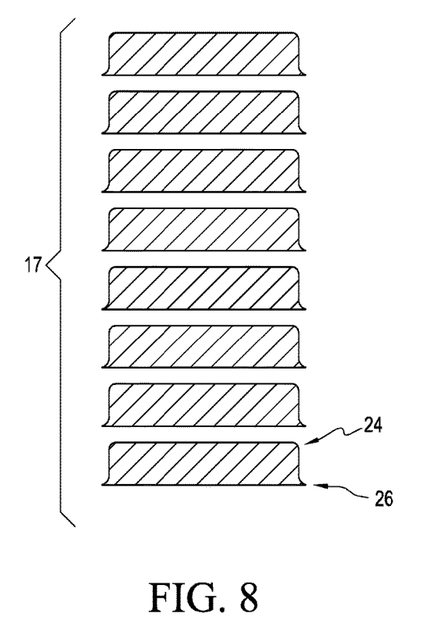
FIG. 8 shows a side view of a packing stack including a plurality of packing buttons 17 prior to compression in accordance with one embodiment of the present invention.

The primary leak sealing is accomplished by the compression of a packing stack including a plurality of packing buttons 17. As seen in FIG. 8, one embodiment of the present invention includes packing buttons 17 including a rounded packing button edge 24 and a feathered packing button edge 26. These packing buttons 17 are preferably formed from ePTFE foam (e.g., GORE-TEX®). Table 5 provides examples of the various amounts of packing buttons used and the compression that is provided:

TABLE 5

Using the prototype load pins: 0.690" and 0.647" long

| # of Buttons | Packing Height (in.) | Initial Plug Gap (in.) | Total Displacement (in.) | Total compression |
|---|---|---|---|---|
| 16 | 1 | 0.59 | 0.459 | 46% |
| 17 | 1.0625 | 0.6525 | 0.5215 | 49% |
| 18 | 1.125 | 0.715 | 0.584 | 52% |
| 19 | 1.1875 | 0.7775 | 0.6465 | 54% |
| 20 | 1.25 | 0.84 | 0.709 | 57% |

Figure 9:
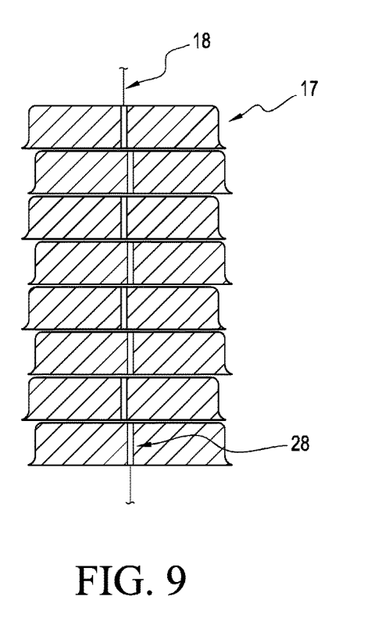
FIG. 9 shows a cross-sectional view of a packing stack including a plurality of packing buttons 17 abutting one another prior to compression in accordance with one embodiment of the present invention.

FIG. 9 shows a packing stack including a plurality of packing buttons 17 abutting one another prior to compression. The feed element 18 passes through an axially extending aperture 28 that is provided in each packing button 17. The axially extending apertures 28 may be individually punched or punched using a randomized, automated process to achieve an offset between adjacent axially extending apertures 28 similar to that which is shown in FIG. 9. Although one of skill in the art can alter the stagger position depending on end-use, the only requirement is that the central apertures 28 between adjacent packing buttons are not perfectly aligned. Typically, the central apertures 28 between adjacent packing buttons 17 are offset from one another by more than 0.006 in, with an offset tolerance up to ±0.015 inch.

Figure 10:
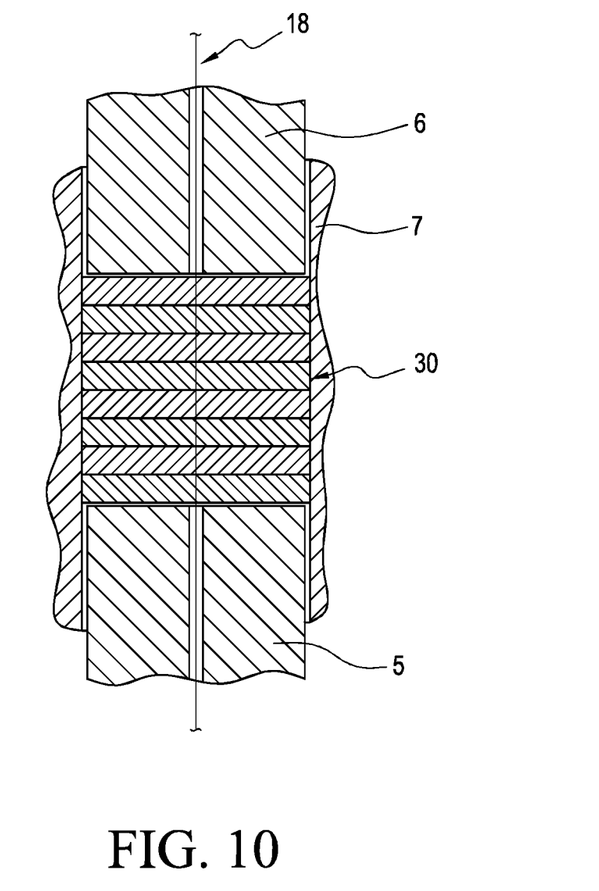
FIG. 10 shows a cross-sectional view of a packing stack including a plurality of packing buttons 17 compressed between a lower compression member 5 and an upper compression member 6 in accordance with one embodiment of the present invention.

FIG. 10 shows a packing stack including a plurality of packing buttons 17 compressed between a lower compression member 5 and an upper compression member 6 with a feed element 18 passing through the lower compression member 5, through the packing buttons 17, and through the upper compression member 6. This arrangement forms a sealing surface 30 between the edges of the packing buttons 17 and the housing 7.

It should be understood by one of ordinary skill in the art that the present feed-through assembly is not limited by its size. For example, the size of the various components may range from ⅛" to 2", or larger.

One of skill in the art would readily be able to ascertain how the present feed-through assembly may be tailored to a specific performance criterion. For example, the number of packing buttons 17 may be varied to increase/decrease the sealing abilities of the feed-through assembly. By way of example, between 3 and 30 packing buttons 17 may be used. Through experimental testing, the following sealing requirements were met using the feed-through assembly of the present example:

3 packing buttons: less than $1 \times 10^{-3}$ scc/s helium leak
8 packing buttons: less than $1 \times 10^{1}$ scc/s helium leak
16 packing buttons: less than $1 \times 10^{-9}$ scc/s helium leak Although the present invention has been disclosed in terms of a preferred embodiment, it will be understood that numerous additional modifications and variations could be made thereto without departing from the scope of the invention as defined by the following claims:

We claim:

1. A feed-through assembly comprising,
   a) a lower compression member including an axially extending aperture extending between an inner, lower compression member surface and an outer, lower compression member surface;
   b) an upper compression member including an axially extending aperture extending between an inner, upper compression member surface and an outer, upper compression member surface;
   c) a packing stack including a plurality of packing buttons each including axially extending apertures, said packing stack has a lower packing button adjacent to said inner, lower compression member surface and an upper packing button adjacent to said inner, upper compression member surface, and wherein each of said packing buttons is made from expanded polytetrafluoroethylene (ePTFE) foam material; and
   d) at least one feed element including a distal end and a proximal end, said at least one feed element extends through said apertures of each of said lower compression member, said packing stack including a plurality of packing buttons, and said upper compression member surface, said distal end of said at least one feed element is exposed to a first boundary environment and said proximal end is exposed to a second boundary environment.

2. The feed-through assembly of claim 1 further comprising,
   e) an optional reaction pin having an axially extending aperture between a first reaction pin end and a second reaction pin end;
   f) an optional reaction bearing having an axially extending aperture between a first reaction bearing end and a second reaction bearing end, such that said first reaction bearing end is adjacent to said second reaction pin end and said second reaction bearing end is adjacent to said outer, lower compression member surface;
   g) an optional plug having an axially extending aperture between a first plug end and a second plug end, such that said first plug end is adjacent to said outer, upper compression member surface, and
   wherein said feed element extends through said apertures of each of said optional reaction pin, optional reaction bearing, lower compression member, said packing stack including a plurality of packing buttons, said upper compression member surface, and said optional plug.

3. The feed-through assembly of claim 1 wherein said packing stack includes a plurality of packing buttons each including an axially extending aperture that is offset from an adjacent axially extending aperture by greater than 0.006 inch.

4. The feed-through assembly of claim 1 wherein said packing buttons are compressed to approximately 20-80% of their original height.

5. The feed-through assembly of claim 4, wherein said packing buttons are compressed to 40-50% of their original height.

6. The feed-through assembly of claim 1 capable of a helium leak of less than $1 \times 10^{-9}$ scc/s.

7. The feed-through assembly of claim 1 capable of a helium leak of less than $1 \times 10^{-3}$ scc/s.

8. The feed-through assembly of claim 1, wherein said distal end is connected to a sensor.

9. The feed-through assembly of claim 1, wherein said feed element is selected from the group consisting of ribbon cable, single cable, single filament, multiple filament, coated or sheathed wire, uncoated or unsheated wire, stranded wire, capillary tubing, and fiber optic material.

10. The feed-through assembly of claim 1, wherein components a)-d) are capable of being separated without destroying any of the components.

11. The feed-through assembly of claim 2, wherein components a)-g) are capable of being separated without destroying any of the components.

12. A method for sealing a first material provided in a first boundary environment from a second material provided in a second boundary environment comprising,
  a) installing said feed-through assembly of claim 1 between said first boundary environment and said second boundary environment.

13. The method of claim 12 wherein said first material is liquid hydrogen and said second material is cryogenic helium.

14. The method of claim 13 wherein the helium leak rate is less than $1 \times 10^{-9}$ scc/s from said feed-through assembly.

15. The method of claim 12 wherein said first boundary environment has a temperature of less than or equal to 20K.

16. The method of claim 15 wherein said second boundary environment has a temperature of less than or equal to 10K.

17. The method of claim 12, wherein said first boundary environment has a temperature of less than or equal to 4K and said second boundary environment has a temperature of less than or equal to 4K.

18. The method of claim 12, wherein said first boundary environment has a temperature up to 600° F.

19. The method of claim 18, wherein said second boundary environment has a temperature up to 600° F.

20. The method of claim 12, wherein said first boundary environment or second boundary environment has a pressure high vacuum is less than 1×E-6 torr.

21. The method of claim 12, wherein said packing stack includes between 3 and 30 packing buttons.

* * * * *